W. S. KINSLEY.

CLEANER FOR FIBROUS STOCK.

APPLICATION FILED JULY 16, 1919.

Reissued Sept. 16, 1919.

14,725.

3 SHEETS—SHEET 1.

*Inventor:*
William S. Kinsley
By Emery, Booth, Janney & Varney Attys

THE COLUMBIA PLANOGRAPH CO., WASHINGTON, D. C.

W. S. KINSLEY.

CLEANER FOR FIBROUS STOCK.

APPLICATION FILED JULY 16, 1919.

Reissued Sept. 16, 1919.

14,725.

3 SHEETS—SHEET 2.

Inventor
William S. Kinsley
by Emery, Booth, Janney & Varney Attys

THE COLUMBIA PLANOGRAPH CO., WASHINGTON, D. C.

W. S. KINSLEY.

CLEANER FOR FIBROUS STOCK.

APPLICATION FILED JULY 16, 1919.

Reissued Sept. 16, 1919.

14,725.

3 SHEETS—SHEET 3.

Inventor:
William S. Kinsley.
by Emery, Booth, Janney & Varney
Attys

THE COLUMBIA PLANOGRAPH CO., WASHINGTON, D. C.

UNITED STATES PATENT OFFICE.

WILLIAM S. KINSLEY, OF READING, MASSACHUSETTS, ASSIGNOR, BY MESNE ASSIGNMENTS, TO THE RUSSELL COMPANY, A CORPORATION OF MASSACHUSETTS.

CLEANER FOR FIBROUS STOCK.

14,725. Specification of Reissued Letters Patent. Reissued Sept. 16, 1919.

Original No. 1,258,573, dated February 19, 1918, Serial No. 154,708, filed March 14, 1917. Application for reissue filed July 16, 1919. Serial No. 311,380.

*To all whom it may concern:*

Be it known that I, WILLIAM S. KINSLEY, of Reading, in the county of Middlesex and State of Massachusetts, have invented certain new and useful Improvements in Cleaners for Fibrous Stock, of which the following is a specification.

This invention relates to machines for cleaning fibrous material such as wool stock, and refers particularly to that type of machines which employ beaters that revolve in a receptacle for the dry stock, said receptacle being usually cylindrical and having grid portions to permit the escape of material dislodged by the beaters from the wool. Such machines are commonly termed wool (or cotton) dusters.

A well-known cleaner or duster of this type has its beating pins projecting radially from bars which are carried by arms which, in turn, are carried by a driven shaft. With this type, much of the fibrous stock instead of reaching position to be acted upon by the revolving pins or beaters, and to come in contact with the grids remains inside the pin-carrying bars between them and the shaft, and therefore receives little or no dusting or cleaning treatment.

One of the objects of my invention is to provide an improved duster or cleaner so constructed that all of the fibrous material is held in annular space within which the cleaning or beating pins operate.

Another object is to provide a machine of the character described which can be employed to first remove all dust or dirt, and then enable the "flyings" (the material comprising the fibers which are too short for use in spinning) to be removed prior to the final removal of the cleaned stock which is to be carded or re-carded.

With these and other objects in view, my invention consists in the cleaner or duster substantially as hereinafter described and claimed.

Of the accompanying drawings.

Similar reference characters are used in all of the views to designate similar parts.

Figure 1:
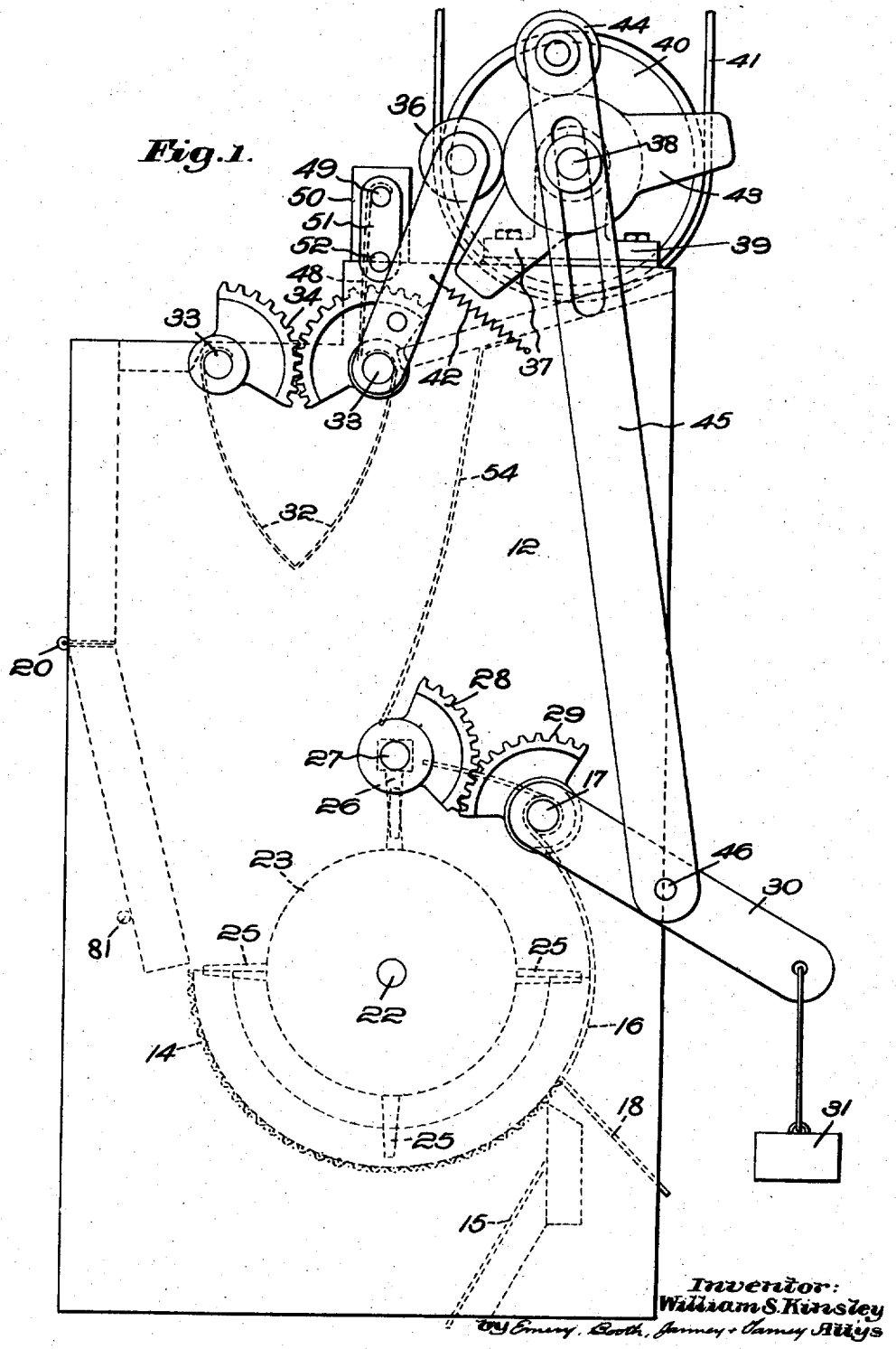
Figure 1 is a side elevation of a machine embodying my improvements.

Suitably supported by side walls 12 is a receptacle 13 for the stock of fibrous material to be treated, said receptacle being hereinafter termed a cage. Said cage as illustrated is in the form of a cylinder having a top portion open, but obviously the open portion might be closed, during operation, by one or more movable or removable cover sections. The lower portion of the cage is of suitable, reticulated material to provide a grid 14 having openings for the escape of foreign material hereinafter referred to briefly as dirt, said dirt being directed to a suitable receptacle (not shown) by a deflector 15.

A curved swinging section 16 carried by a rock shaft 17 forms a side portion of the cage, but is swung outwardly, at intervals as hereinafter described, to permit the discharge of material into any suitable receptacle (not shown), such material being grided to such receptacle between the outwardly swung section and a suitable deflector 18. In effect, the section 16 constitutes a door which is automatically opened at intervals. Opposite the section 16 is a door 19, hinged at 20, and adapted to be secured in the position shown in Fig. 2 by a suitable catch such as a pin 21 fitting a hole in one of the walls 12, so that said door will act to guide material into the cage as hereinafter described.

At the center of the cage is a shaft 22 carrying a drum 23 of such diameter relatively to the diameter of the cage as to provide an annular space between them of, preferably, about 3 inches radial width. From this it will be understood that the drawings illustrate a small machine. If larger, the diameter of the drum would be relatively greater than shown, it being essential that the annular space referred to shall be so narrow as to insure successful operation on all the material contained in said space. The shaft 22 and its drum are rotated at a high rate of speed in the direction of the arrow in Fig. 2 by any suitable means, such as by a belt on a pulley 24 (Fig. 3) attached to one end of the shaft.

Projecting radially from the drum 23 are several rows of pins 25, said pins alternating (in the longitudinal direction) with pins 26 projecting inwardly from a shaft 27, mounted in bearings in or carried by the side walls, and having at one end (Fig. 1) a pinion or toothed segment 28 meshing with another pinion or toothed segment 29 carried by rock shaft 17 having an arm 30 which is held in lower position by a spring or a weight 31. The gear connections are such that when arm 30 is raised, the section 16 of the cage is swung out, and the pins 26 are swung aside, as indicated by dotted lines in Fig. 2.

A hopper to deliver a small quantity of fibrous material into the cage, to be cleaned or dusted, comprises two members 32 depending from rock shafts 33 having intermeshing toothed segments or pinions 34 (Fig. 1). Connected to one of the shafts 33 is an arm 35 having a roll 36 which is acted upon by a cam 37 carried by a shaft 38 mounted in bearings 39, said shaft having a pulley 40 which is driven by a belt 41 at a much slower speed than pulley 24 of the beater drum. A spring 42 holds the arm 35 with its roll 36 bearing on cam 37 or the hub thereof.

Another cam 43 has its hub secured to shaft 38, and acts upon a roll 44 at the upper end of a link 45 the lower end of which is pivotally connected at 46 to the arm 30 of shaft 17. The link is guided in its vertical movements by its slot 47 engaging a reduced end of shaft 38.

A plate 48 (Figs. 2 and 3) is carried by a shaft 49 mounted in bearing blocks 50 and having an arm 51 (Figs. 1 and 3) provided with a pin or roll 52 overlapping arm 35.

A curved plate or strip 53 closes the space between the shafts 17 and 27 at the top of the cage, and a plate or wall 54 closes the space above shaft 27.

In operation the hopper 32, 32 is filled with the fibrous material to be dusted or cleaned, as, for instance, three ounces, and when the machine is run by belts on the pulleys 24 and 40, the cam 37, acting on the roll of arm 35 causes the hopper sections to part and spill the entire contents into the cage. That is, each charge is completely dumped and not supplied gradually. During the time that the hopper sections stand apart to spill the contents, and until they close, no more stock can be deposited in the hopper by a careless attendant, because the plate 48 occupies the position indicated by dotted lines in Fig. 2 and acts as a guard or barrier. The rapid rotation of the pins 25 in the cage, at a speed of, for instance, 1200 revolutions per minute, coacting with the stationary pins 26, causes such agitation or beating of the material as to dislodge dirt which, by gravitation and centrifugal force, quickly reaches the inner wall of the cage, some immediately escaping through the grid and the rest being soon worked through by the rubbing action of the material as it is carried over the grid. The narrowness of the annular space through which the pins 23 pass insures thorough treatment because none of the material can lodge in any central position where it could escape treatment or receive insufficient treatment.

The timing of the operation of the parts is such that when the dirt has been practically all removed, the cam 43 of shaft 38 reaches roll 44, and lifts link 45 to automatically open the swinging section 16 and permit the cleaned stock to escape. This automatic escape of the cleaned stock is effected by centrifugal force, the tapered shape of the pins permitting all stock which has become wrapped around the pins to slide off. If the member 23, instead of being a drum of considerable size, were a relatively small shaft, long fiber stock would be so wrapped around it as not to be capable of automatic removal as described.

Figures 2, 4:
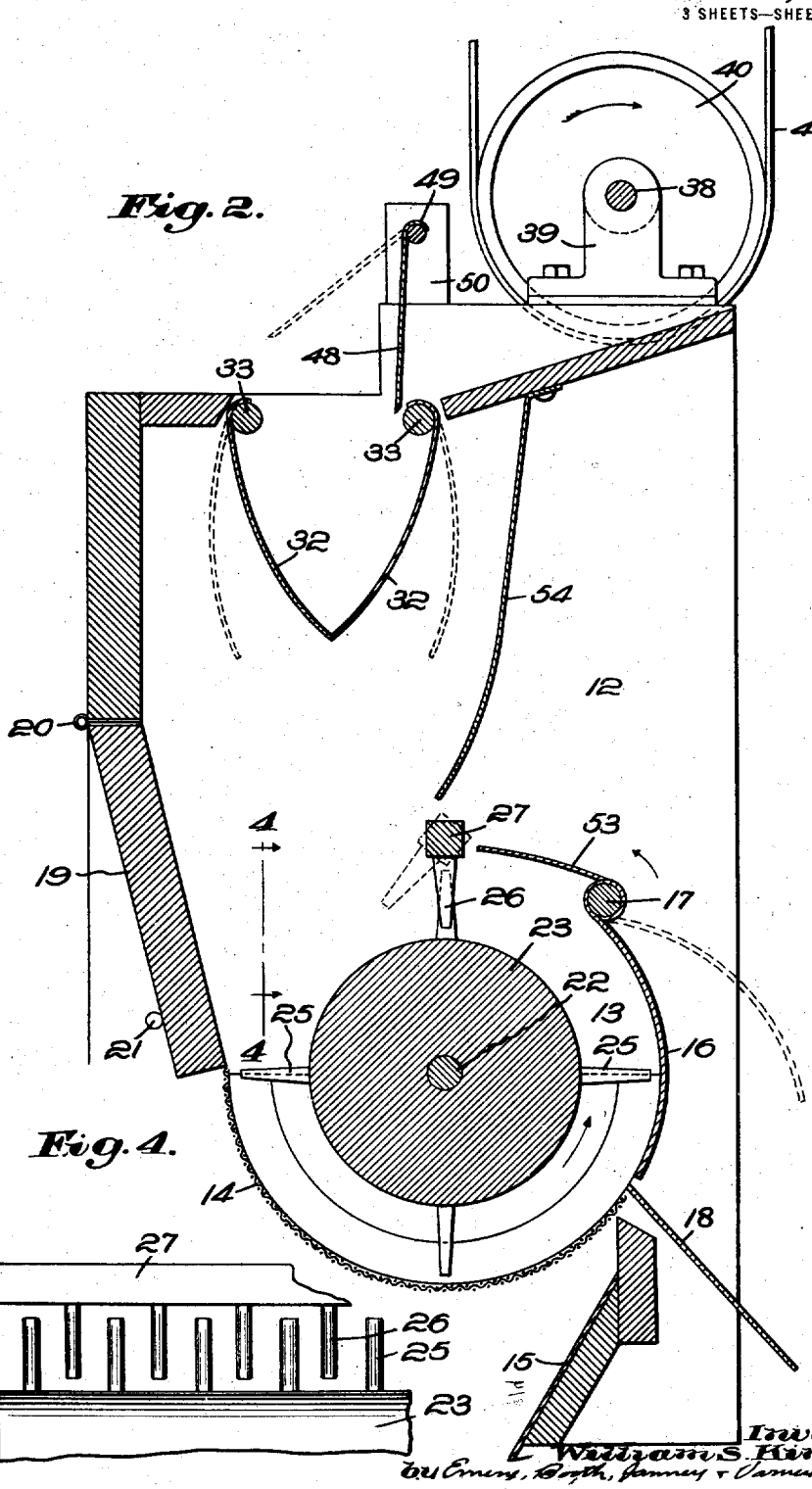
Fig. 2 represents a vertical section in a plane parallel with the side shown in Fig. 1.
Fig. 4 is a detail view on line 4—4 of Fig. 2, but illustrating the pins as straight sided instead of tapered.
Figure 3:
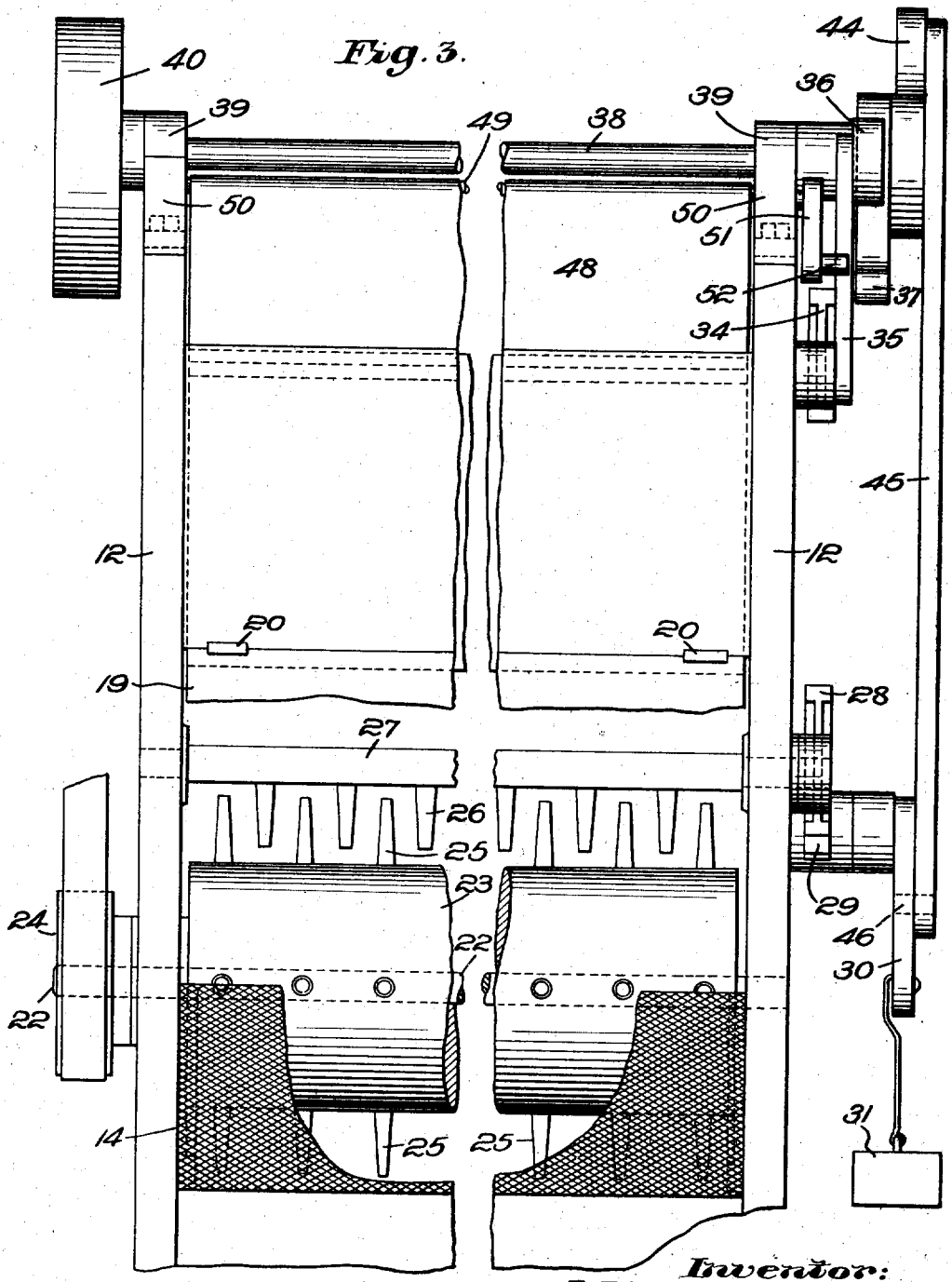
Fig. 3 represents an elevation from the left of Fig. 1.

The reason for mounting the stationary pins 26 on a rock shaft, and actuating said shaft to swing the pins aside to the dotted line position of Fig. 2 when the door section 16 opens, is to effect the removal of the fibers which have accumulated on said pins. When the pins 26 are in said position, the rotation of pins 25 in the direction of the arrow carries their outer ends between the pins 26 in a path starting near the shaft 27 and proceeding to and beyond the ends of said pins 26, thus positively sweeping or pulling the fibers off and mingling them with those which are then thrown out under the outwardly swung door 16.

While the stock in the cage is being cleaned, an attendant fills the hopper (the sections of which have, in the meantime, closed) with another small stock to be cleaned. The capacity of the hopper is such as to hold not more stock than can be accommodated for treatment at one time in the annular space of the cage, said hopper thus serving to measure the proper quantity that will be supplied through the passageway adjacent the door or guide 19 to the cage. As soon as one mass of stock has been cleaned, and discharged as described, the door 16 and the pins 26 automatically return to the full line position of Fig. 2, and the hopper sections part or open and dump or spill another small charge of stock into the hopper.

The member 19 not only acts to guide the stock from the hopper to the cage but, being hinged, can be opened if, for any reason, access is desired to the cage from that side of the machine.

I do not limit myself to a machine employing tapered pins. Fig. 4 illustrates pins which are uniform in size from end to end. With a machine having straight pins as shown in Fig. 4, the stock that becomes wrapped around them will not readily be caused to slide off by centrifugal force. This requires a slightly different operation, as follows: After discharge of the dirt in the manner hereinbefore described, and the opening of door 16, power is shut off from the machine and an attendant can then use a knife if necessary to separate from the pins such mass as clings thereto. Such a structure of machine (with straight pins) is especially useful for the separation of short fiber stock from long fiber stock. In this case, after removal of all material that will escape through the grid, the long fiber stock will be assembled on the pins, with the short fiber stock close to the wall of the cage. Then rotation of the drum and its pins, while door 16 is held open by any suitable means or by hand, will sweep the short fiber stock out. After this, the machine is stopped and the long fiber stock pulled or cut away from the pins.

Having now described my invention in one of its embodiments, although without attempting to illustrate or describe all of the possible modifications or variations thereof, what I claim is:

1. A fiber-stock cleaner comprising outer and inner members mounted to provide a relatively narrow annular space or chamber of uniform width between them, said members having pins traversing said space, the outer member having openings for the escape of dirt, means for rotating one member at a high speed relatively to the other, means for automatically and intermittently delivering complete small charges of stock to said space, and means for automatically removing the charges from said space at periods of time alternating with said delivery.

2. A fiber-stock cleaner comprising outer and inner members mounted to provide a relatively narrow annular space or chamber of uniform width between them, said members having tapering pins traversing said space, the outer member having openings for the escape of dirt, means for rotating one member at a high speed relatively to the other, means for automatically and intermittently delivering complete small charges of stock to said space, and means for automatically removing the charges from said space at periods of time alternating with said delivery.

3. A machine of the character described, comprising a cage having a grid section, a door section, and a passageway for the admission of stock, rotary beaters in said cage, a two-section hopper above said passageway, means for periodically opening said hopper, means for periodically opening said door section at times when the hopper is closed, a movable barrier above the hopper, and means for actuating the barrier to obstruct the entrance to the hopper while the latter is open.

4. In a fiber-stock cleaner, a cage having a door for the escape of cleaned stock, a rotary drum having pins, a rock shaft having pins projecting toward the axis of rotation of the drum, and means for opening the door and actuating the rock shaft in a direction to swing its pins aside to permit the drum pins to effect removal of fibers from the pins of the rock shaft.

5. In a fiber-stock cleaner a cage having a door for the escape of cleaned stock, a rotary drum having pins, a rock shaft having pins projecting toward the axis of rotation of the drum, the pins of both sets being tapered, and means for opening the door and actuating the rock shaft in a direction to swing its pins aside to permit the drum pins to effect removal of fibers from the pins of the rock shaft.

6. A fiber-stock cleaner comprising a cage having a grid section and a door section, a rotary drum having beater pins in said cage, a shaft having two cams, connections whereby one cam effects the opening of the cage door, a two-section hopper to receive stock to be cleaned, connections whereby the other cam effects the opening of the hopper to deliver its contents to the cage, and independent means for rotating said drum and said shaft whereby the drum may be rapidly operated to effect cleaning of the stock in the cage before the cams perform their functions.

7. In a fiber-stock cleaner, a cage having a door for the escape of cleaned stock, a rotary element having beating projections therefrom, coöperating beating elements projecting toward the axis of rotation of the rotary element, means for opening said door to permit escape of cleaned stock and means for moving said coöperating beating elements away from the axis of rotation of said rotary element to facilitate discharge of the cleaned stock through said door.

8. In a fiber-stock cleaner, a cage having a door for the escape of cleaned stock, a rotary drum having pins, coöperating pins independent of said drum and projecting toward the axis of rotation of said drum, means for opening the door and means for retracting said coöperating pins to facilitate removal of cleaned stock from the cage by said drum pins.

9. In a fiber-stock cleaner, a cage having a door for the escape of cleaned stock, a rotary element having beating projections therefrom, coöperating beating elements projecting toward the axis of rotation of the rotary element, automatically timed means for opening said door to permit escape of cleaned stock, and coördinately timed means for moving said coöperating beating elements away from the axis of rotation of said rotary element to facilitate discharge of the cleaned stock through said door.

10. In a fiber-stock cleaner, a cage having a door for the escape of cleaned stock, a rotary drum having pins, coöperating pins independent of said drum and projecting toward the axis of rotation of said drum, automatically timed means for opening the door and coördinately timed means for retracting said coöperating pins to facilitate removal of cleaned stock from the cage by said drum pins.

11. A fiber-stock cleaner comprising outer and inner members providing a chamber between them, said members having pins traversing said space, the outer member having openings for the escape of dirt, means for rotating one member relative to the other, an inlet to the chamber, a door therefor, means for intermittently opening and briefly holding open the door to permit the introduction as a unit substantially at one moment of time of a batch of material accumulated on the outside of the door since the previous operation thereof, and means for automatically removing the charges from said space at periods of time alternating with said delivery.

In testimony whereof I have affixed my signature.

WILLIAM S. KINSLEY.

Copies of this patent may be obtained for five cents each, by addressing the "Commissioner of Patents, Washington, D. C."